US008151788B2

(12) United States Patent  (10) Patent No.: US 8,151,788 B2
Bourne  (45) Date of Patent: Apr. 10, 2012

(54) WALL OR ROOF OF A BUILDING WITH AT LEAST ONE HEAT CONTROLLING ELEMENT

(76) Inventor: Stephen Glyn Bourne, Hong Kong (CN)

( * ) Notice: Subject to any disclaimer, the term of this patent is extended or adjusted under 35 U.S.C. 154(b) by 55 days.

(21) Appl. No.: 12/747,279

(22) PCT Filed: Dec. 10, 2008

(86) PCT No.: PCT/EP2008/010467
§ 371 (c)(1),
(2), (4) Date: Aug. 20, 2010

(87) PCT Pub. No.: WO2009/074298
PCT Pub. Date: Jun. 18, 2009

(65) Prior Publication Data
US 2011/0198052 A1    Aug. 18, 2011

(30) Foreign Application Priority Data
Dec. 10, 2007 (EP) .................................... 07023874

(51) Int. Cl.
F24J 2/34 (2006.01)
(52) U.S. Cl. ........................................ 126/617; 126/569
(58) Field of Classification Search .................. 126/569, 126/617, 618, 702, 400; 52/220.1
See application file for complete search history.

(56) References Cited

U.S. PATENT DOCUMENTS 4,144,931 A * 3/1979 Medico, Jr. .................. 165/48.2
4,290,416 A * 9/1981 Maloney ........................ 126/618
4,324,226 A * 4/1982 Beck ............................. 126/618
4,382,437 A   5/1983 Woods, Jr. et al.
4,424,804 A * 1/1984 Lee ................................ 126/572
4,461,277 A * 7/1984 Pardo ............................ 126/573
4,739,748 A   4/1988 Stice

FOREIGN PATENT DOCUMENTS

| CH | 641231 A5 | 2/1984 |
| CN | 1468355 A | 1/2004 |
| FR | 2492436 | 10/1980 |
| FR | 2524128 | 3/1982 |
| FR | 2537257 A1 | 6/1984 |
| FR | 2653528 A1 | 4/1991 |
| GB | 1503800 A | 3/1978 |
| JP | 58060158 A | 4/1983 |
| JP | 7119363 A | 5/1995 |
| WO | 8700569 A1 | 1/1987 |
| WO | 2009074298 A3 | 6/2009 |

* cited by examiner

Primary Examiner — Brian Glessner
Assistant Examiner — Paola Agudelo
(74) Attorney, Agent, or Firm — Vidas, Arrett & Steinkraus P.A.

(57) ABSTRACT

The invention concerns a wall or roof of a building, wherein at least one heat controlling element for controlling a temperature in the building is arranged in the wall or the roof to form a segment of the wall or roof, the heat controlling element comprising at least a first section and a second section, the first section comprising a heat collecting and storing material and the second section comprising a heat insulating material, wherein the heat controlling element may adopt a first configuration, in which the first section is directed towards the outside of the building and the second section is directed towards the inside of the building, and a second configuration, in which the second section is directed towards the outside of the building and the first section is directed towards the inside of the building.

25 Claims, 2 Drawing Sheets

WALL OR ROOF OF A BUILDING WITH AT LEAST ONE HEAT CONTROLLING ELEMENT

CROSS-REFERENCE TO RELATED APPLICATIONS

This application is a U.S. National Stage application which claims priority to PCT/EP2008/010467, filed on Dec. 10, 2008, which claims priority to European Patent Application 07 023 874.6, the contents of which is hereby incorporated by reference

STATEMENT REGARDING FEDERALLY SPONSORED RESEARCH

Not applicable

BACKGROUND OF THE INVENTION

The invention concerns a wall or roof of a building, wherein at least one heat controlling element for controlling a temperature in the building is arranged in the wall or the roof to form a segment of the wall or roof, the heat controlling element comprising at least a first section and a second section, the first section comprising a heat collecting and storing material and the second section comprising a heat insulating material, wherein the heat controlling element may adopt a first configuration, in which the first section is directed towards the outside of the building and the second section is directed towards the inside of the building, and a second configuration, in which the second section is directed towards the outside of the building and the first section is directed towards the inside of the building.

Solar energy is being used more and more to control the temperature of buildings. According technologies have become quite sophisticated in the past years. However, solar energy still has many inherent difficulties particularly with regard to costs and additional energy requirements to harness the incoming solar energy. Generally, when controlling temperatures of buildings it has been known to use the so-called green house effect. Further, when using solar energy, voltaic cells converting solar power into electricity or solar furnaces, wherein mirrors concentrate sunlight to a furnace, are being used. It is also known to heat water in tubes by the sun which water is then circulated to storage mediums. Some of these tubes are now insulated in vacuum flasks to maximize efficiency. Another known system to use solar energy is the so-called "trombe wall". This system works by collecting heat from the sun and storing it in the thermal mass of the wall structure. Over a period of time the heat passes by conductivity and radiation through the wall to the inside spaces of buildings, thereby warming them. Usually, trombe walls are of a specific thickness and weight so that heat collected during the day enters the habitat in the evening and continues to radiate heat during the night. However, with this system there is no way to flexibly control the amount of heat passing through the wall. Accordingly, for example in summer it may be too hot while in winter the wall may even be a negative radiator sucking heat out of the space.

From JP 07-119363 a solar shading device is known comprising a panel which can be rotated in a wall. On one side of the panel a blind, in the form of slats, is provided. In summer, the panel can be positioned in the wall such that the slats are directed towards the outside of the building thus blocking incoming sunlight through reflection. In this way, overheating of the building is prevented. In winter, when the room of the building is heated, the panel is turned by 180° so that the slats face the inside of the room. On the opposite side of the panel, now facing towards the outside of the building, a sheet glass is provided through which the winter sunlight can penetrate thus bringing solar energy into the room. In this way, the heating load of the room is reduced in winter.

Accordingly, with the known panel sunlight can be blocked during summer like with a conventional blind. In winter, the blind (slats) is positioned on the inside of the building thus letting the solar energy into the room. However, the known device can only provide heating of the room when sunlight is actually falling onto the device. If the intensity of sunlight changes, this results in a change in the heating of the building as well. The device can therefore not provide uniform heating of the room. Further, the known device lacks flexibility with regard to controlling the temperature in the building.

Starting from the prior art discussed above, it is an object of the invention to provide a wall or roof of the above mentioned kind, wherein the temperature in a building can be controlled evenly, efficiently and flexibly at low cost.

For a wall or roof of the above mentioned kind the invention solves the object in that the heat controlling element may be connected to the building structure by at least one connecting element so that there is direct thermal contact between the heat controlling element and the building, wherein the connecting element is adjustable between a contacting position for providing direct thermal contact between the heat controlling element and the building structure and an interrupting position for interrupting direct thermal contact between the heat controlling element and the building structure.

BRIEF SUMMARY OF THE INVENTION

The general idea of the invention is to collect and store heat in the heat controlling element with a heat collecting and storing material and transporting this heat from the outside of the building to the inside of the building or vice versa. The heat insulating material thereby ensures that heat from the heat collecting and storing material cannot dissipate in an uncontrolled manner. In particular, when the first section with the heat collecting and storing material faces the outside of the building, it is heated by incoming solar radiation. In this position, the heat insulating material facing the inside of the building stops the heat stored in the heat collecting and storing material from reaching the inside of the building. When a sufficient amount of heat is stored in the heat collecting and storing material, the heat controlling element can be pivoted or otherwise configured in the wall or roof of the building to the second configuration. In this configuration, the heat collecting and storing material faces the inside of the building while the heat insulating material faces the outside of the building. Thus, the heat stored in the heat storing material can be transported into the inside of the building essentially through thermal radiation, but also by conduction and convection. The heat insulating material on the outside of the element thereby ensures that the stored heat cannot dissipate to the outside of the building. Generally, the insulating material keeps the stored heat inside the element and keeps unwanted heat or cold outside as required. In this way, heat can be "scooped" from the outside of the building into the building. In an analogue manner, heat can be transported from the inside of the building to the outside of the building, thus cooling the room and the element itself cooled by radiation outside and cool air in the air gap. In particular, when facing the inside of the building, the heat storing material can store heat coming from the building. After storing the heat the element is configured into the first configuration and the heat stored in the heat storing material, for example during the day, can be transported to the outside of the building, for example during night, when the outside is cooler than the heat storing material. Accordingly, in the first configuration of the element heat is exchanged with the outside of the building, while in the second configuration heat is exchanged with the inside of the building.

The heat storing medium of the heat controlling element or "fin" is heat sensitive and absorbs radiant and convective heat. Accordingly, it provides a thermal mass. The stored heat can be given off for example by thermal radiation. In this respect, the thermal mass of the heat collecting and storing material is such that a room in the building can be considerably heated or cooled by the heat storing material. The room can be heated by thermal radiation of the heat storing material.

According to the invention, the element, in particular the heat collecting and storing material, may be connected to the building structure, such as one or more metal reinforcing bars of the building structure, by a connecting element, such as a screw or similar mechanism, preferably both in the first and in the second configuration, so that there is direct thermal contact between the element and the building. Thereby, adjustable connectors are provided for effecting direct thermal contact between the element and the building structure, such that thermal contact can be established and interrupted, as required. Such adjustable connectors can for example be moved between the contacting position, providing direct thermal contact between the panel and the building structure, and an interrupting position, interrupting direct thermal contact between the panel and the building structure. The direct thermal contact between the element and the metal reinforcement of the building may be effected by a screw or similar mechanism wound onto the panel as required. For the connecting element a number of constructive embodiments are possible. For example, besides the connecting element being a screw, it could be a hydraulic piston, a lever or similar device. The connecting element may also be a tube which is used in air-conditioning systems and again could be screwed out to establish thermal contact. Such a tube may contain a fluid which boils and vaporizes or condenses to move heat by change of state (a so-called "heat-pipe").

The adjustable connecting elements achieve two goals: (a) that the heat is directly transferred to the structure using the building's own thermal mass as a storage medium directly and (b) the heat controlling element itself is cooled and therefore will be a more effective heat collector. This method may also be reversed when the temperatures are lower outside and the building structure needs to be cooled. Also, with the adjustable connectors the connection to the heat storing material of the heat controlling element may be interrupted for example when the heat storing element becomes very hot in summer and in fact no heating of the building structure through thermal contact to the heat storing element is desired. Existing curtain wall panels (including the glass) may also be connected to the building structure to provide heating or cooling of the structure.

In the interrupting position of the connecting element, and in particular in the second configuration of the heat controlling element as well, the first section of the heat controlling element comprising the heat collecting and storing material may be thermally insulated from the building structure. In this way, unwanted contact between the building structure and the heat collecting and storing material and thus overheating or overcooling of the building structure may be avoided.

According to an embodiment the heat controlling element may be a panel, said panel, for adopting the first configuration and the second configuration, may be rotatable in the wall or the roof between a first position and a second position, wherein in the first position the first section of the panel is directed towards the outside of the building and the second section of the panel is directed towards the inside of the building, and wherein in the second position the second section is directed towards the outside of the building and the first section is directed towards the inside of the building. According to this embodiment, the whole panel is rotated in the wall in order to adopt the first and second configurations.

The sections of the panel or fin can be arranged adjacent to one another or one or more further sections can be arranged between them. The sections can be layers which can be arranged parallel to one another. Also, the first and second sections can consist of the heat collecting and storing and heat insulating material, respectively. It is noted that while the first or second section is directed towards the outside or inside of the building, they are facing in the direction inside or outside of the building. However, it is possible that other sections are arranged between them and the outside or inside of the building, respectively. The collecting properties also act as a radiator when the collecting and heating panel turns inwards to warm or cool the room.

The embodiment described above with the panel has the advantage that heat can be transferred with the panels very quickly. Of course, rotating the panel as a whole presents a limit as to the size of in particular the heat storing material. If a certain size is exceeded it may be difficult or impossible to rotate the panel manually or through other means. In this respect, a further embodiment suggests that the first section of the heat controlling element is fixed in a predetermined position in the wall and the second section of the heat controlling element is rotatable about the first section in order to adopt the first and second configurations of the heat controlling element. According to this embodiment, only the insulating section of the heat controlling element has to be rotated which will normally be much lighter than the heat storing section. The first section with the heat storing material may stay put in position and can thus be considerably larger and heavier than with the panel. However, transfer of heat may not be as quick as with the previous embodiment including rotating panels.

The panels or second sections of the heat controlling elements may be rotated by 180° in order to be switched between the first and second configuration or position. Of course they may also be rotated by more or less than 180°, for example to open the wall or roof for air circulation, as desired, or to optimise collection angles towards the sun. Rotating of the panel or second section can be carried out through a control unit provided with the heat controlling element. The control unit can for example drive electric motors or similar devices to rotate the panel or second section. It may be computer-controlled. Sensors for sunlight, temperature and so forth can be provided which are read out by the control unit. In this way, the rotating may be performed automatically depending on parameters such as sunlight intensity or temperature. It is also possible to integrate weather forecasts to be considered by the control unit so that the system can be proactive, storing heat for long periods or predicted cool temperatures and low levels of sunlight. The energy for the rotation of the panels or second sections could be provided by solar cells integrated into the wall or roof of the building. These could be integrated for example into the heat controlling elements or panels themselves or for example into spaces arranged between the heat controlling elements or panels. Alternatively, the rotating of the heat controlling elements or panels could also be performed manually to save energy.

The heat controlling element ("solar fin") provides a very simple and cost-effective way of flexibly and efficiently collecting and controlling energy obtained from the sun to produce heat and/or electrical power. It can be used in new buildings or retrofitted into any existing building, for example a building glass envelope. The invention uses the heat as required and can deal with it in several different ways. The problems of conventional trombe walls are overcome by storing heat in a thermal mass while insulating the mass from the inside of a building and then turning the mass internally when needed. In this respect, the heat controlling element need not provide a thermal mass as large as conventional trombe walls since the inventive element can be heated and turned inwards and outwards in short intervals so that the building space can be warmed in a few hours rather than waiting for the heat to pass through a large thermal mass. In its basic form the inventive system will not be significantly more expensive than a conventional glass rainscreen wall which is now common practice.

The heat collecting and storing material can comprise, in particular consist of, concrete, such as glass reinforced concrete, or a steel material or a plastics material or a contained substance which stores latent heat in the temperature working range through change of state or similar material that has a high thermal storage and is self supporting or (if not self supporting) is contained in a supporting structure. Possible materials include steel planks, a heavy plastic, or any material contained in a waterproof vessel, e.g. water which changes state at different temperatures. Such materials are cheap and readily available. Also, concrete can be filled into the heat controlling element on the building site, thereby facilitating transport. The heat collecting and storing material can comprise a solar black paint, i.e. a material designed to absorb as much heat as possible. However, the heat collecting and storing material could also comprise or consist of a medium that changes its state at different temperatures, i.e. steam, fluid and solid. Such material could for example be water or a similar material with a narrower change of state temperature range than water. The insulating material could comprise, in particular consist of, a (hard) foam, such as a Styrofoam, polyurethane foam and/or a phenolic foam. Such material, while also being cheap and readily available, is particularly light weight and as such easy to transport. The insulating material could also comprise, in particular consist of a rigid fibreglass insulating board. The material of the insulating material should be fire-proof and capable of working in a broad temperature range. An outer skin of the heat controlling element could be extruded aluminium or steel shell. The heat controlling element could be cut to length on site as required. Also the heat controlling element can span between roof beams or if vertical be contained in a simple frame. As such, the heat controlling element can be combined with traditional building elements such as windows.

The second section can further comprise a reflective material. Such a reflective material provides better protection against incoming sunlight, therefore also better insulation. The reflective material may comprise or consist of a metal, such as an aluminium or steel material. The reflective material may also comprise or consist of a reflective plastic or paint or indeed another solar collection device such as solar voltaic cells to make use of unwanted energy. The material may be present in the form of a foil. Also, pressed steel or aluminium extrusions can be used for an outer casing of the heat controlling element and these could have a polished and/or reflective surface.

The wall or roof may comprise a glass layer facing the outside of the building providing an outer air gap between the glass layer and at least one heat controlling element or panel arranged in the wall or roof Accordingly, the green house effect is used, wherein the air gap is heated due to incoming solar radiation penetrating through the glass layer, changing wavelength and thereby being trapped. At the same time, the air gap heated by the green house effect is insulated from the inside of the building. Thus, there is no uncontrolled heating of the building through the air gap. If needed, heated or cooled air can be vented outside of or into the air gap or, if required, directly into the building as pre-heated or cooled fresh air. Also, hot air not needed in the building can be vented outside of the air gap for heat storage or other uses, such as heat exchangers, pre-heated or cooled fresh air intake and so forth. In a particularly cost efficient manner the glass layer may be clear glass which is significantly cheaper than coated glass used in curtain walls these days. In particular, the known glasses have very expensive tints and coatings to reflect significant amounts of heat but in doing so become hot themselves and then act as radiators. Due to the inventive insulation between the air gap and the inside of the building this problem is overcome.

At least two heat controlling elements or panels, in particular a plurality of heat controlling elements or panels, can be arranged in the wall or roof It is possible, to provide the second sections or panels individually rotatable. By rotating individually, one heat controlling element or panel may be collecting energy whilst an adjacent heat controlling element or panel is turned inside to heat the building. This may be particularly important early on a cold morning as heat will be required quickly. By individually rotating the panels or second sections, the temperature in the building can be controlled individually to the specific needs in the building or in particular rooms of the building in a fast manner, no matter whether heating or cooling is required.

At least one heat insulating spacer may be arranged between the heat controlling elements or panels in the wall or roof The spacer is insulated to the full width and in this way, no matter which way the heat controlling elements or panels are facing, no heat can dissipate from the building or vice versa, except through the heat controlling elements or panels. The insulating could be performed by glass combined with a translucent insulation. The spacers can be designed to any shape or curvature. The spacer could be a shaped glass block or plank or extrusion which allows the fins to turn, but also allows an indirect light (but not heat) into the building, thus reducing lighting costs. Due to the even spacing, the quality of incoming light would be very good. Glass spacers may be coated so that they darken in intense light. Nevertheless, the wall or roof may comprise additional windows for normal views and daylight. These may be reduced in size, however, compared to conventional windows. The spacer may have the same width as the heat controlling element or panel to provide integrity of insulation of the building in both configurations of the heat controlling element or panel.

As the spacer is static it may be used for other solar technologies, such as solar voltaic cells which may be provided on the spacer. Also, at least one pipe can be provided running through the heat insulating spacer in order to heat a fluid introduced into the pipe. According to this embodiment, e.g. water may be introduced into the pipe and thus be heated by heat stored in the spacer material. The heated water can then be used for heating, but also for other needs in a building, for example domestic water heating such as for a bathroom or as cooking water. The same system could be used to cool the heat controlling elements or panels in extreme conditions as tap water is typically 55° F. when it enters the building. With this embodiment, the heat stored can be efficiently used for other purposes than heating the building directly.

Between each spacer and heat controlling element or panel at least one seal may be arranged for sealing the wall or roof against air circulation. Air convection is one of the most significant causes of heat gain or loss. The seal ensures that no unwanted heat gain or loss can occur due to circulating air between the inside and the outside of the building. It is possible that the seal can be operated between a sealing position, in which the wall or roof is sealed against air circulation, and a released position, in which the wall or roof is not sealed against air circulation. In this way, in the released position, the panels or second sections may be rotated without unnecessary friction. According to an embodiment the seal can for example be inflated for adopting the sealing position and deflated for adopting the released position or moved mechanically with a cam or similar device working with the rotation of the second section or the solar fin so as to create a seal. Generally, the seals may be pneumatically or mechanically operated to reduce friction when the solar fin is turned. However, by inflating or deflating the seal the sealing or released position can be adopted particularly easily. A pneumatic seal may for example comprise a tubular insulating rope which can be inflated with low pressure to seal all joints. A suitable material would be neoprene.

In order to prevent injuries caused by the rotation of the second sections or the panel and the potentially very hot heat storing section, an inner wall may be provided which can prevent direct access to the heat controlling elements or panels from inside the building. The inner wall is preferably thermally insulated and may run parallel to the wall comprised of the heat controlling elements or panels and the spacers. Between the inner wall and the heat controlling elements or panels at least one inner air gap may be provided. Such an inner air gap allows controlling the temperature in the building by controlling the thermal contact between the inner air gap and the inside of the building, such as a room. To this end, at least one, preferably a plurality of adjustable louvers or louver fins, may be provided in the inner wall which can be operated between an open position allowing air circulation between the inner air gap and the inside of the building and a closed position preventing air circulation between the inner air gap and the inside of the building. In practice there are usually provided 2 or more louvers in order to allow air flow in and out of the inner air gap. In this way, thermal contact between the inside of the building and the inner air gap, which is in thermal contact with the heat controlling elements or panels, can be controlled effectively by allowing heat transfer by radiation and/or convection between the inner air gap and the inside of the building, as required. Alternatively or additionally, at least one, preferably a plurality of adjustable fans and/or vents, may be provided in the inner wall which can ventilate air from the inner air gap into the inside of the building and vice versa. With such vents or fans hot or cold air can actively be transported between the inner air gap and the inside of the building, as required to control the temperature in the building. When the vents or fans are not operated, they may prevent air circulation between the inner air gap and the inside of the building. This allows flexibility in the storage of heat for several days if required.

The panel or second section may be rotated between the first and second position or configuration diurnally in its simplest form, or as required. In this way, the temperature in the building can be controlled particularly flexibly. The heat brought into or out of the building can be adapted to specific needs which may change on a daily basis and which may be different in winter or summer time and depending on the weather conditions. For instance, the second sections or panels could be turned if there is no sun and the collecting material is effectively losing heat, while turning the insulating face outside will stop the heat loss. The panel or second section may also be rotated several times a day. The second section or panel may be maintained in the first configuration or position during day time and in the second configuration or position during night time. In this way the heat collecting and storing material is for example heated up by sunlight during daytime and gives off this heat to the inside of the building at night time. However, the heat controlling element may also be maintained in the second configuration during daytime and in the first configuration during night time. With this embodiment the inside of the building may for example be cooled by taking heat out of the room into the heat storing material during daytime and giving off this heat to the outside of the building at night time. Either way, the heat controlling elements or panels may remain in the respective first or second configuration or position for essentially the whole day and night, respectively, or only part of the day or night. In particular, there may be disruptions during the day or night where the heat controlling element may be rotated into a different position. Generally, the heat controlling element is rotated as required depending on the weather conditions. The panel or second section is designed so that it is perfectly balanced and its axle coincides with its centre of gravity thus minimising the energy required to turn it.

The panel or second section may be partly turned to allow air conditioned and heated by the greenhouse effect in the outer cavity to be vented directly inside in a similar manner to a conventional louver.

Existing technology may be added to the system as described above. Such technology is including but not limited to solar voltaic cells for producing electricity, tubes within the heat controlling elements to heat water or indeed cool the elements, and air systems to use the green house heated air. The system according to the invention will be more efficient than any of these devices used individually. The elements are simple to construct and could be assembled from kits on site with a small production line and pre-fabricated key elements. The elements can be designed such that they are easy to carry and install with no special tools.

Generally, conductive heat can be stored and reused, and is trapped by the heat controlling element through the insulation so that it may be controlled. Convective heat can either be ducted into the building for heating or vented outside to minimize heat gain. Venting hot air could be passed over water tubes to heat water. Radiant heat can either be stored as heat or converted to electricity, alternatively. The system may have photovoltaic cells on the insulated side of the elements. This is not essential, however in climates where cooling will be priority, the solar energy may be utilized in this way. The second sections or panels may be sized so that they may be hand-operated.

According to the invention the gained energy is collected and controlled either for heating, cooling, radiating the energy or converting it to electricity or for example heating water. Thereby, the energy is contained at the face of the building and modified as required before entering the building. Also, energy is not let out of the building as the heat controlling elements are insulated and may have protective foils, and all joints are sealed against air movement. The buildings measure of heat loss/gain is thus substantially improved, and indeed this is now controlled pro-actively.

BRIEF DESCRIPTION OF THE SEVERAL VIEWS OF THE DRAWINGS

In the following, an embodiment of the invention is described with reference a drawings.

The wall in the drawings is shown schematically and does not represent original proportions. Unless otherwise specified, same reference numerals depict the same features in the drawings.

Figure 1:
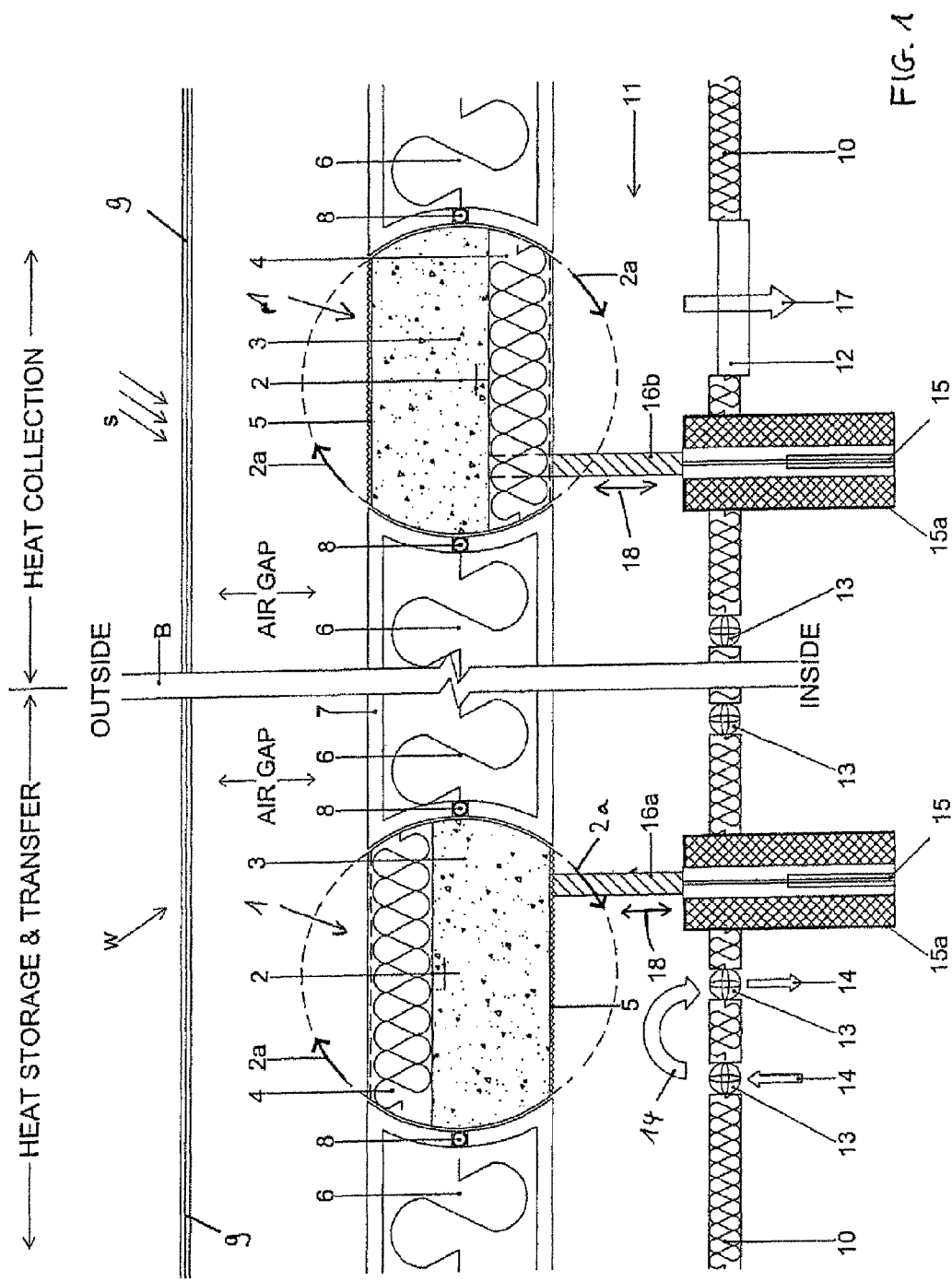
FIG. 1 shows part of a wall according to a first embodiment of the invention in a cross-sectional view.

In the following, FIG. 1 will be explained first:

The wall W of FIG. 1 contains a number of panels 1 which are each rotatable about a pivot axis 2, as indicated schematically by arrows 2a. Each panel comprises a first section 3 and a second section 4. The first section 3 consists of a heat collecting and storing material 3, in this example glass-reinforced concrete. The heat collecting and storing material is heat absorbing and provides a thermal mass. On the outer side of the first section 3 a heat absorbing black paint 5 is provided in order to improve heat collection. The second section 4 consists of a heat insulating material and a reflective material, in the shown example insulation and reflective foils. The heat insulating material may also comprise hard foam, for example polyurethane foam with appropriate characteristics to comply with building regulations. The two sections 3 and 4 of each panel 1 are formed as parallel and adjacent layers.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Between the panels 1 heat insulating spacers 6 are provided respectively to the full width of the panel so that in either panel position the integrity of the insulation is maintained. Each heat insulating spacer 6 comprises a shell 7 of glass or aluminium extrusion. Inside the shell 7 the spacer 6 may contain rockwool with aluminium or a translucent insulation with glass or glass fibre, if opaque. A water tube (not shown) may run through the outside face of spacer 6 in order to heat water running through the tube or cooling the spacer 6 or adjacent panel. Between each spacer 6 and panel 1, a seal 8 is arranged for sealing the wall W against air circulation. The seals 8 consist of tubular neoprene and may be inflated to adopt a sealing position, in which the wall W is sealed against air circulation, and deflated to adopt a released position, in which the wall W is not sealed against air circulation. The released position facilitates rotation of the panels 1 around the pivot axis 2. Also possible in this respect is a mechanism which is forced to seal the air gap by use of springs and or cams to create an air tight joint in conjunction with the turning of the panel.

The wall W further comprises a clear glass layer (curtain wall) 9 facing the outside of the building and providing an air gap between the glass layer 9 and the panels 1. The cavity between the glass layer 9 and the panels 1 will contain hot or cool air which can be vented inside the building, outside of the building or collected and stored and used for other purposes, such as heat exchangers, when not needed in the building. This can be achieved separately (e.g. by vents or fans arranged in air gap) or by opening the panels like a louver as required. Furthermore, an inner wall 10 may be provided on the inside of the building to prevent direct access to the panels 1 from inside the building. The inner wall 10 runs parallel to the wall comprised of the panels 1 and the spacers 6. The inner wall 10 protects the occupants from the heat that has been collected and stored in the first sections 3 as this may be as high as 100° C. and also any danger due to the rotation of the panel 1. The inner wall 10 could be as simple as a mesh to avoid contact directly with the panel or may be insulated so that the heat collected is not dissipated immediately or may be glass to coincide with translucent insulated spacers.

Between the inner wall 10 and the panels 1 at least one inner air gap 11 is provided. The inner air gap 11 is in thermal contact with the panels 1 and thus heated or cooled by the panels 1, respectively. The inner air gap 11 allows controlling the temperature in the building by controlling the thermal contact between the inner air gap 11 and the inside of the building, such as a room of the building. In FIG. 1 an adjustable louver 12 or louver fin 12 is shown arranged in the inner wall 10. The louver 12 can be operated between an open position allowing air circulation between the inner air gap 11 and the inside of the building and a closed position preventing air circulation between the inner air gap 11 and the inside of the building. In this way, thermal contact between the inside of the building and the inner air gap 11 can be controlled effectively. In particular, heat transfer between the inner air gap 11 and the inside of the building is effected by radiation and convection between the inner air gap 11 and the inside of the building, as required by opening or closing the louver 12. This heat transfer is schematically shown by arrow 17 in FIG. 1 for heat coming from the inner air gap 11 into the inside of the building.

In the example shown in FIG. 1, additionally, a plurality of adjustable fans 13 and/or vents is provided in the inner wall 10 which can ventilate air naturally or mechanically from the inner air gap 11 into the inside of the building and vice versa. Also, vents could be arranged in the inner wall 10, similarly. Operation of the fans 13 allows for an active transportation of hot or cold air between the inner air gap 11 and the inside of the building, as required to control the temperature in the building. For example, neighbouring fans 13 may be operated in opposite rotating directions such that a rapid air exchange in the building and thus a rapid control of temperature in the building is achieved, as shown schematically with arrows 14 in FIG. 1. Of course, different fans 13 may also be rotated in the same rotating direction.

The temperature sensitive section 3 may be connected to the reinforcement bars of the building (as required) so that heat is directly connected by conduction to heat or cool the building, thus directly using the thermal storage capacity of the building. In particular, the first section 3 with the heat storing material can be connected to the building structure, particularly the metal reinforcement of the building, both in the first and in the second position of the panel 1. In this way direct thermal contact can be achieved between the panel and the building. This is shown schematically in the drawing. A metal reinforcement bar of the building is shown partially at 15 in a building structure 15a, such as a beam, wall, floor etc. This reinforcement bar 15 can be thermally connected to the panel 1 through adjustable connectors 16a and 16b. This achieves direct thermal contact to the building. Thus, in the case of connector 16a, the heat from the panel 1 is directly transferred to the structure using the building's own thermal mass as a storage medium. In case of connector 16b, this connector 16b may be pushed longitudinally through the insulating section 4 to contact the heat storing section 3 (as is shown in dotted lines) and thus allowing cooling the fin during heating so that efficiency is increased. The method may be reversed when the temperatures are lower outside of the building and the building structure needs to be cooled. The connectors 16a, 16b for establishing direct thermal contact are adjustable to control thermal contact between the heat collecting and storing material and the reinforcement bar 15.

In the example shown the connectors 16a, 16b may be moved longitudinally as schematically shown by arrows 18 from the extended connection position shown in FIG. 1 to an interrupted position (not shown) in which the connector is retracted into the building structure so that it does not contact the reinforcement bar 15 or the panel 1 anymore, thus interrupting direct thermal contact between the reinforcement bar 15 and the panel 1. The longitudinal movement of the connectors 16a, 16b may for example be effected through a handle inside the building (not shown) which could be manually operated. Of course the connectors 16a, 16b could also be operated automatically with an electric turning motor or similar.

Monitoring systems could be added to this wall W to effectively control the equipment (vents, fans, louvers, etc.) and thus the temperatures. For rotating the panels 1 a computer-controlled control unit (not shown) is provided which is connected to a plurality of sensors for temperature and/or sun radiation intensity in order to automatically rotate the panels 1 as needed.

In FIG. 1 two panels 1 are shown in different positions. In particular, panel 1 on the left side in FIG. 1 is shown in the second position, while panel 1 on the right side in FIG. 1 is shown in the first position. Solar radiation S penetrates the glass layer 9, directly heats panel 1 by radiation which in turn heats up the air in the outer air gap due to the green house effect. The panel 1 on the right side in FIG. 1 collects solar radiation and stores it in the heat collecting and storing material of the first section 3. The black paint maximises collection of radiant heat. At the same time, the second section 4 with its insulating material and reflective foils ensures that none of the heat can dissipate into the inside of the building. For example, in winter time this position may be adopted during daytime. In the evening, when no sun light is irradiating the building, the panel 1 may be rotated by 180° in order to adopt the second position shown in the left part of FIG. 1. In this position the heat gathered in the heat collecting and storing material during the day may be given off to the inside of the building for example by thermal radiation or convection. In this position, the second section 4 with the heat insulating material ensures that the heat is only given off to the inside of the room and cannot dissipate towards the outside of the building.

Similarly, the first position shown in the right side of FIG. 1 may be adopted during night time in summer to cool the first section with the heat collecting and storing material, for example. During subsequent daytime, the panel 1 may then be rotated into the second position shown in the left part of FIG. 1. During the day, when the inside of the building may be too warm the heat collecting and storing material may then cool the inside of the building while the insulating section 4 blocks heat from coming in.

The spacers 6 as well as the panels 1 may be used in several ways with conventional solar technology. The spacer 6 may also be made of glass combined with translucent insulation so that the building receives insulated diffuse daylight. The seals 8 ensure that no unwanted loss of thermal energy occurs due to air circulation between the inside of the building and the outside or the air gap, respectively. The air gap may be vented by vents (not shown). For a flexible controlling of the temperature in the building, the panels 1 may be rotated individually. The embodiment shown in FIG. 1 allows for a particularly quick transfer of heat.

In FIG. 1, left side of the break line B heat storage and transfer takes place, while in the right side of break line B heat collection takes place.

The heat collecting and storing material section 3 is insulated from the building structure and only connected by the adjustable connectors when required. In this manner, the structure is not overheated or overcooled by the storage elements, while maintaining a much higher degree of control of the temperature of the building's own thermal mass.

Figure 2:
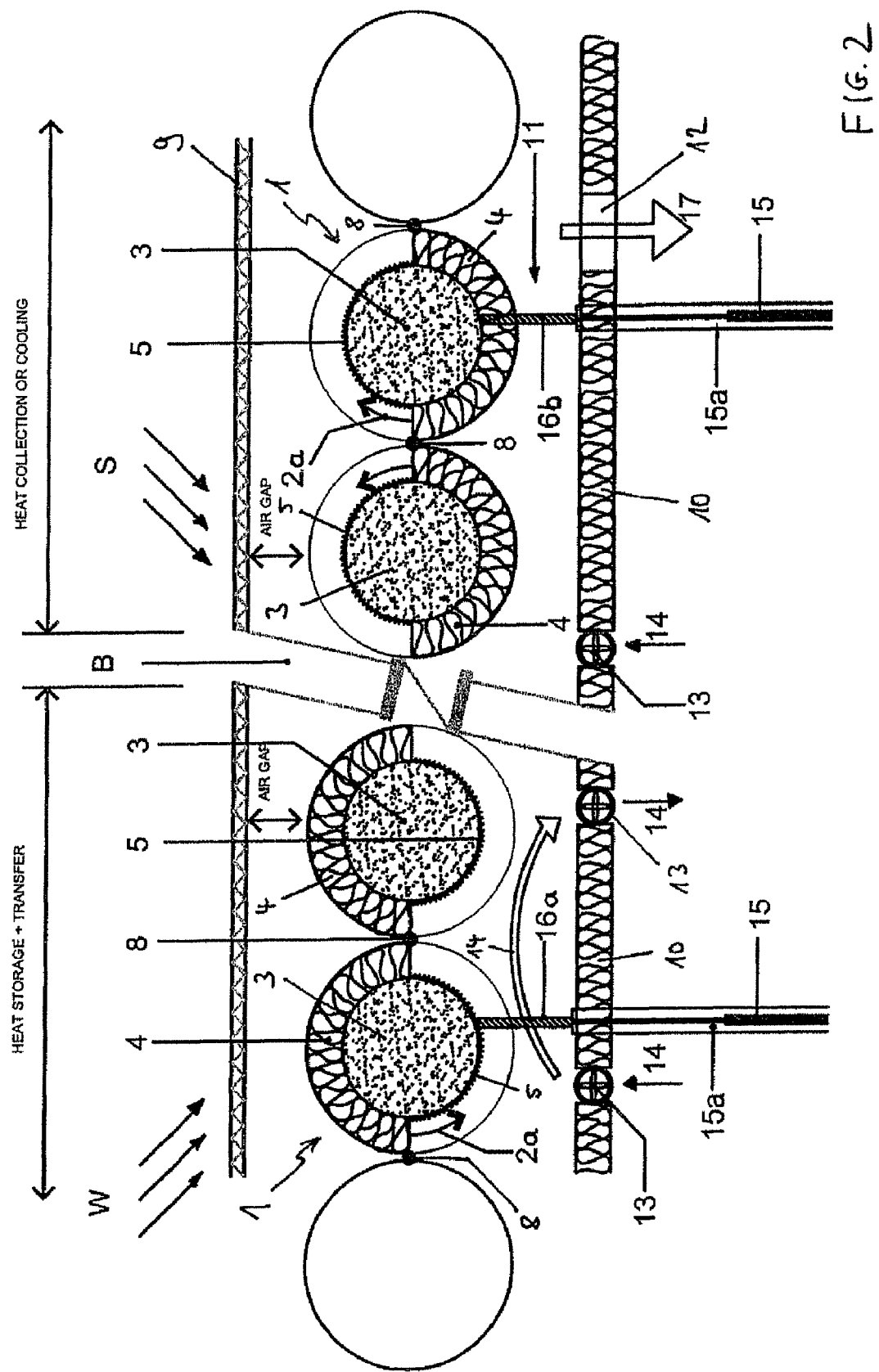
FIG. 2 shows part of a wall according to a second embodiment of the invention in a cross-sectional view.

In the following the embodiment shown in FIG. 2 will be explained:

The embodiment shown in FIG. 2 largely corresponds to the embodiment as shown in FIG. 1 and like reference numerals depict like features. However, different than in the embodiment of FIG. 1, in the embodiment shown in FIG. 2 the first sections 3 of the heat controlling elements are fixed in a predetermined position in the wall and the second sections 4 of the heat controlling elements 1 are arranged rotatable about the first sections 3, respectively, in order to adopt the first and second configurations of the heat controlling elements 1. More specifically, the first section 3 with the heat collecting and storing material 3 is arranged in the wall in the form of a column. The second section 4 with the insulating material is in the form of a hollow cylinder and is arranged to be rotatable around the first section 3, as indicated by the arrows 2a. In this way, the heat controlling element 1 may adopt a first configuration in which the first section 3 with the heat collecting and storing material is directed towards the outside of the building and the second section 4 with the heat insulating material is directed to the inside of the building, as shown in the right part of FIG. 2. Similarly, in this fashion the heat controlling element 1 may adopt a second configuration in which the second section 4 with the heat insulating material is directed to the outside of the building and the first section 3 with the heat collecting and storing material is directed to the inside of the building, as shown in the left part of FIG. 2.

Depending on the thermal conditions in the building and outside of the building, in this manner the inside of the building may be heated or cooled, as described previously. Again, the adjustable connectors 16a, 16b are provided for establishing or interrupting direct thermal contact with the building structure, as desired. With the embodiment of FIG. 2 the first sections 3 with the heat storing material, which may be concrete or a similar heavy material, do not have to be moved for adopting the first or second configurations. Only the second section with the comparatively light heat insulating material will be moved. Therefore, the first sections may be designed considerably bigger than in the embodiment of FIG. 1.

It is noted that the heat collecting and storing material section 3 is insulated from the building structure and only connected by the adjustable connectors when required. In this manner, the structure is not overheated or overcooled by the storage elements, while maintaining a much higher degree of control of the temperature of the building's own thermal mass.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Wall or roof of a building, wherein at least one heat controlling element (1) for controlling a temperature in the building is arranged in the wall (W) or the roof to form a segment of the wall (W) or roof, the heat controlling element (1) comprising at least a first section (3) and a second section (4), the first section (3) comprising a heat collecting and storing material and the second section (4) comprising a heat insulating material, wherein the heat controlling element (1) may adopt a first configuration, in which the first section (3)

is directed towards the outside of the building and the second section (4) is directed towards the inside of the building, and a second configuration, in which the second section (4) is directed towards the outside of the building and the first section (3) is directed towards the inside of the building, characterized in that the heat collecting and storing material of the heat controlling element (1) may be connected to a metal reinforcement of the building structure (15) by at least one connecting element (16a, 16b) so that there is direct thermal contact between the heat collecting and storing material of the heat controlling element (1) and the metal reinforcement of the building, wherein the connecting element (16a, 16b) is adjustable between a contacting position for providing direct thermal contact between the heat collecting and storing material of the heat controlling element (1) and the metal reinforcement of the building structure (15) and an interrupting position for interrupting direct thermal contact between the heat controlling and storing material of the heat controlling element (1) and the metal reinforcement of the building structure (15).

2. Wall or roof according to claim 1, characterized in that in the interrupting position of the connecting element (16a, 16b) the first section (3) of the heat controlling element (1) comprising the heat collecting and storing material is thermally insulated from the metal reinforcement of the building structure (15).

3. Wall or roof according to claim 1, characterized in that the heat controlling element (1) is a panel (1) said panel (1), for adopting the first configuration and the second configuration, is rotatable in the wall (W) or the roof between a first position and a second position, wherein in the first position the first section (3) of the panel (1) is directed towards the outside of the building and the second section (4) of the panel (1) is directed towards the inside of the building, and wherein in the second position the second section (4) is directed towards the outside of the building and the first section (3) is directed towards the inside of the building.

4. Wall or roof according to claim 1, characterized in that the first section (3) of the heat controlling element is fixed in a predetermined position in the wall and the second section (4) of the heat controlling element is rotatable about the first section in order to adopt the first and second configurations of the heat controlling element.

5. Wall or roof according to claim 1, characterized in that the heat collecting and storing material comprises concrete, such as glass reinforced concrete, or a steel material or a plastics material or a contained substance which stores latent heat in the temperature working range through change of state.

6. Wall or roof according to claim 1, characterized in that the insulating material comprises a foam, such as a polyurethane foam and/or a phenolic foam.

7. Wall or roof according to claim 1, characterized in that the insulating material comprises rigid fibreglass board.

8. Wall or roof according to claim 1, characterized in that the second section (4) further comprises a reflective material.

9. Wall or roof according to claim 8, characterized in that the reflective material comprises a metal, such as an aluminium or steel material.

10. Wall or roof according to claim 8, characterized in that the reflective material comprises a reflective plastic or paint.

11. Wall or roof according to claim 1, characterized in that it comprises a glass layer (9) facing the outside of the building providing an air gap between the glass layer (9) and at least one heat controlling element (1) or panel (1).

12. Wall or roof according to claim 1, characterized in that at least two heat controlling elements (1) or panels (1) are arranged in the wall (W) or roof, wherein the heat controlling elements (1) or panels (1) can be rotated individually.

13. Wall or roof according to claim 1, characterized in that at least two heat controlling elements (1) or panels (1) are arranged in the wall (W) or roof and at least one heat-insulating spacer (6) is arranged between the heat controlling elements (1) or panels.

14. Wall or roof according to claim 13, characterized in that the spacer (6) has the same width as the heat controlling element (1) or panel (1) to provide integrity of insulation of the building in both positions of the heat controlling element (1) or panel (1).

15. Wall or roof according to claim 13, characterized in that at least one pipe is provided running through the spacer (6) in order to heat a fluid introduced into the pipe.

16. Wall or roof according to claim 13, characterized in that between each spacer (6) and heat controlling element (1) or panel (1) at least one seal (8) is arranged for sealing the wall (W) or roof against air circulation.

17. Wall or roof according to claim 16, characterized in that the seal (8) can be operated between a sealing position, in which the wall (W) or roof is sealed against air circulation, and a released position, in which the wall (W) or roof is not sealed against air circulation.

18. Wall or roof according to claim 17, characterized in that the seal (8) can be inflated for adopting the sealing position and deflated for adopting the released position or moved mechanically with a cam or similar device working with the rotation of the heat controlling element (1) or panel (1) so as to create a seal.

19. Wall or roof according to claim 1, characterized in that it comprises an inner wall (10) which can prevent direct access to the heat controlling elements (1) or panels (1) from inside the building.

20. Wall or roof according to claim 19, characterized in that between the inner wall (10) and the heat controlling elements (1) or panels (1) at least one inner air gap (11) is provided.

21. Wall or roof according to claim 20, characterized in that at least one adjustable louver (12) is provided in the inner wall (10) which can be operated between an open position allowing air circulation between the inner air gap (11) and the inside of the building and a closed position preventing air circulation between the inner air gap (11) and the inside of the building.

22. Wall or roof according to claim 20, characterized in that at least one adjustable fan (13) and/or vent is provided in the inner wall (10) which can ventilate air from the inner air gap (11) into the inside of the building and vice versa.

23. Wall or roof according to claim 1, characterized in that the connecting element (16a, 16b) is movable between the contacting position and the interrupting position.

24. Wall or roof according to claim 1, characterized in that the heat controlling element (1) may be connected to the metal reinforcement of the building structure (15) by the at least one connecting element (16a, 16b) both in the first and in the second configuration of the heat controlling element (1).

25. Wall or roof according to claim 1, characterized in that at least one adjustable connector is a screw, a lever, a piston, in particular a hydraulic piston or a heat pipe.

* * * * *